June 11, 1957 R. W. ROBERTS 2,795,752
AMPLIFIERS
Filed July 10, 1953 3 Sheets-Sheet 1
Fig. 1.
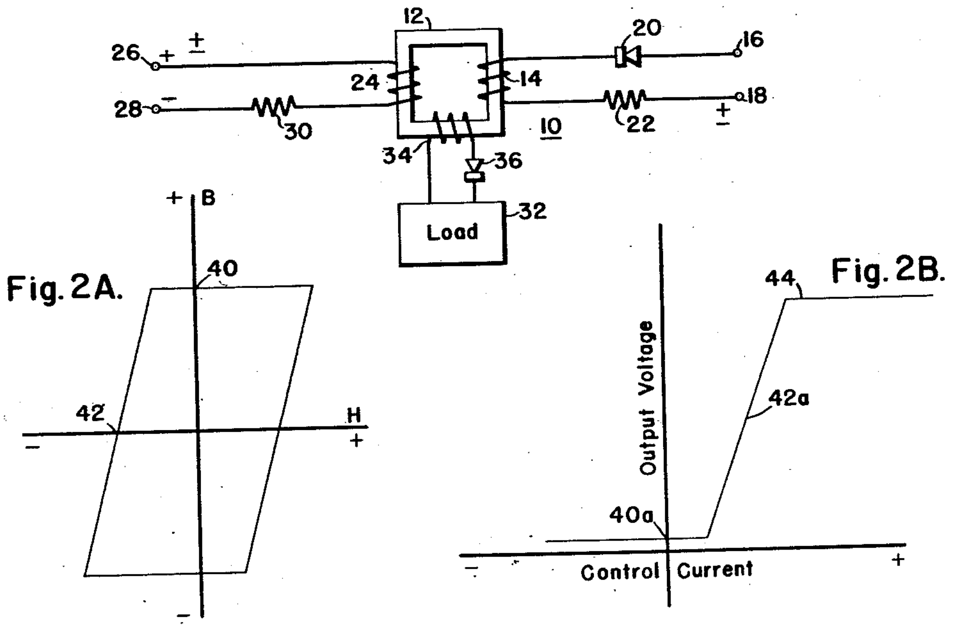
Fig. 1. Fig. 2A. Fig. 2B.
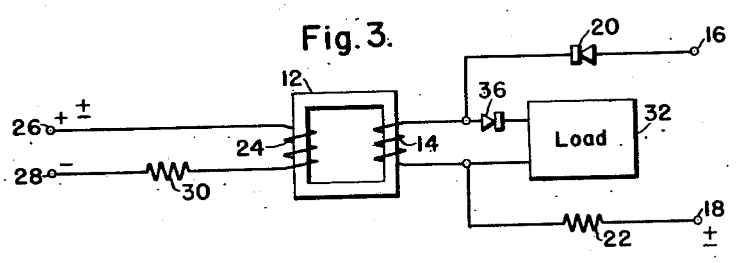
Fig. 3.
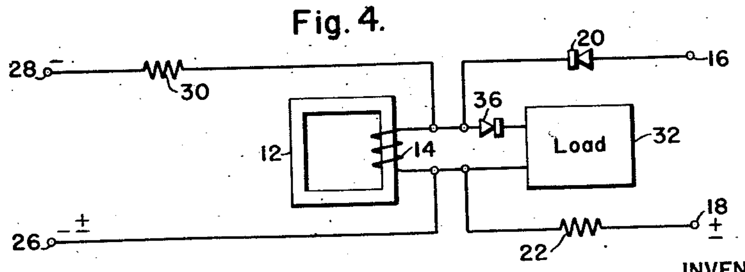
Fig. 4.
WITNESSES:
John E. Healy
K. H. Thomas
INVENTOR
Roland W. Roberts
BY Ezra L. Savage
ATTORNEY June 11, 1957 R. W. ROBERTS 2,795,752

AMPLIFIERS

Filed July 10, 1953 3 Sheets-Sheet 2

WITNESSES:

John E. Healy

K. W. Thomas

INVENTOR

Roland W. Roberts.

BY

Ezra L. Savage

ATTORNEY

AMPLIFIERS

Filed July 10, 1953 3 Sheets-Sheet 3

WITNESSES:
John E. Healy
K. W. Thomas

INVENTOR
Roland W. Roberts.
BY Ezra W. Savage
ATTORNEY

United States Patent Office 2,795,752

Patented June 11, 1957

2,795,752

AMPLIFIERS

Roland W. Roberts, Pittsburgh, Pa., assignor to Westinghouse Electric Corporation, East Pittsburgh, Pa., a corporation of Pennsylvania Application July 10, 1953, Serial No. 367,202

9 Claims. (Cl. 321—2)

This invention relates to stationary induction apparatus and more particularly to magnetic amplifiers.

Many types of magnetic amplifiers have been developed. However, in the past it has been found necessary to compensate these prior art magnetic amplifiers in order to obtain certain desirable features. For instance, the normal magnetic amplifier is sensitive to changes in the magnitude of its alternating-current supply voltage. In addition, it is impossible in the normal prior art magnetic amplifier, unless some compensating means is provided, to reduce the output of the magnetic amplifier to substantially absolute zero. However, in many applications, it is necessary to reduce the output to such an absolute zero for the magnetic amplifier.

An object of this invention is to provide a novel type of magnetic amplifier whose average output voltage is rendered insensitive to changes in the magnitude of the supply voltage as applied to the magnetic amplifier by so correlating the components of the magnetic amplifier as to obtain an average output voltage from the magnetic amplifier that is determined by the change in flux in a magnetic core from a controlled flux reset point to saturation flux, the supply voltage and the other components of the magnetic amplifier being such as to always effect, during alternate half-cycles of the supply voltage, a change in flux in the magnetic core from the controlled flux reset point to saturation flux.

Another object of this invention is to provide for conductively isolating the output of a magnetic amplifier from its alternating-current input supply, by providing a separate output winding for the magnetic amplifier which is responsive to the change in flux in a magnetic core from a controlled flux reset point to saturation flux in the magnetic core.

A further object of this invention is to provide for obtaining a substantially absolute zero output from a magnetic amplifier, by controlling the average output voltage of the magnetic amplifier in accordance with the change in flux in a magnetic core from a controlled flux reset point to a saturation flux so that the control signal to the magnetic amplifier can be increased to such a value that the controlled flux reset point substantially corresponds to the saturation flux point to thereby produce substantially no change in the flux in the magnetic core and thus, under such conditions, render a substantially absolute zero output from the magnetic amplifier.

Other objects of this invention will become apparent from the following description when taken in conjunction with the accompanying drawings in which:

Fig. 1 is a schematic diagram of a half-wave magnetic amplifier embodying a teaching of this invention;

Figs. 2A and 2B show an idealized hysteresis loop and a curve which illustrates the operation of the apparatus illustrated in Fig. 1;

Fig. 3 is a schematic diagram of another embodiment of this invention in which a common winding functions as both an exciting winding and an output winding for a half-wave magnetic amplifier;

Fig. 4 is a schematic diagram of a half-wave magnetic amplifier embodying another teaching of this invention and in which a common winding functions as an exciting winding, a control winding, and an output winding;

Figure 5:
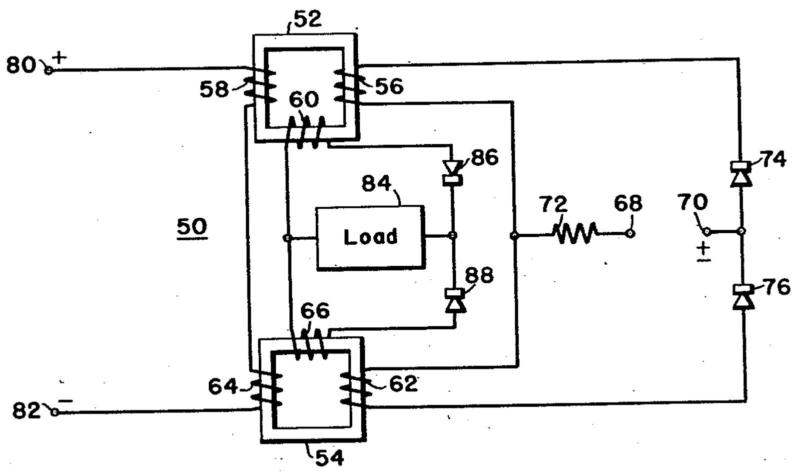
Fig. 5 is a schematic diagram of a direct-current controlled full-wave magnetic amplifier embodying a further teaching of this invention.
Figure 6:
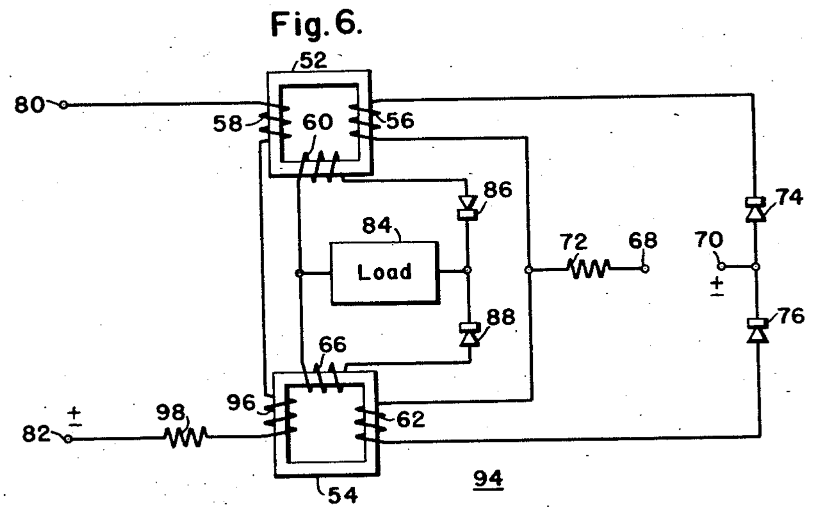
Figure 7:
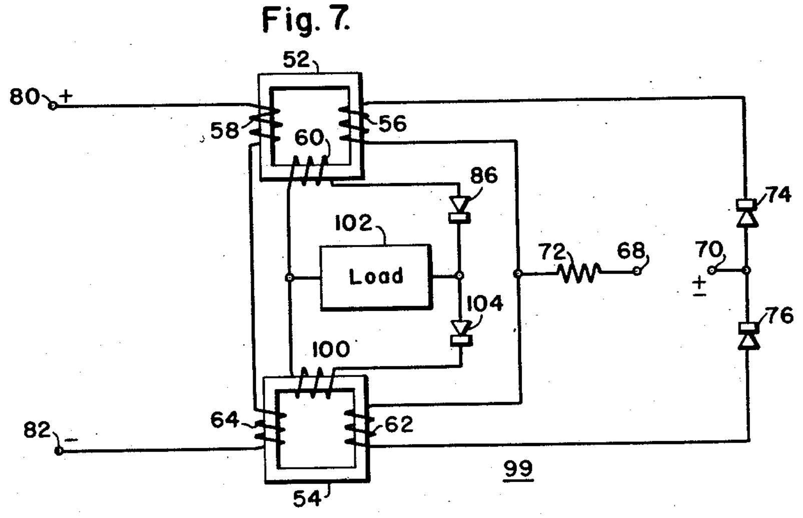
Figure 8:
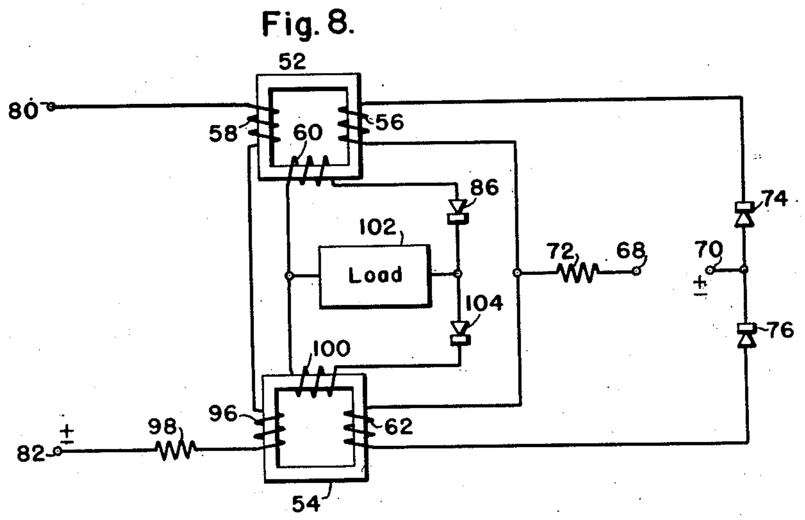

Fig. 6 is a schematic diagram of a full-wave magnetic amplifier corresponding to the magnetic amplifier illustrated in Fig. 5, except that the amplifier illustrated in Fig. 6 is adapted to be controlled by an alternating-current signal; and Figs. 7 and 8 are schematic diagrams of full-wave magnetic amplifiers which are similar to the amplifiers illustrated in Figs. 5 and 6, respectively, except the amplifiers of Figs. 7 and 8 supply alternating current to a load instead of direct current.

Referring to Fig. 1 of the drawings, there is illustrated a saturating-transformer magnetic amplifier 10 embodying the teaching of this invention. As illustrated, the magnetic amplifier 10 comprises a magnetic core member 12, preferably constructed of rectangular core loop material.

In this instance, an exciting winding 14 is disposed in inductive relationship with the core member 12. Circuit means, connected to the exciting winding 14 and to terminals 16 and 18, is provided for supplying current to the exciting winding 14 during alternate half-cycles of an alternating-current supply voltage, as applied to the terminals 16 and 18 by a suitable source of alternating-current (not shown). In particular, a rectifier 20 is so connected between the terminal 16 and one end of the exciting winding 14 as to permit the passage of current through the exciting winding 14 only during alternate half-cycles of the alternating-current supply voltage appearing across the terminals 16 and 18. An impedance, in this instance a resistor 22, is connected between the other end of the exciting winding 14 and the terminal 18 in order to limit the flow of current through the exciting winding 14 once the core member 12 has reached saturation. In practice, the exciting winding 14, the rectifier 20, and the resistor 22 are so constructed and the magnitude of the alternating-current supply voltage so applied to the terminals 16 and 18, as to always effect a substantially complete magnetic saturation of the core member 12 during the alternate half-cycles of the alternating-current supply voltage when the rectifier 20 conducts current. In other words, the alternating-current supply voltage must be greater than the saturation voltage of the exciting winding 14, and the exciting circuit resistance must be low enough to allow sufficient current to flow so that saturation flux will be obtained in the core member 12 with whatever loading is present on the output and control windings 23 and 24, respectively.

In order to reset, during the nonconducting periods of the exciting winding 14, the flux level in the core member 12 from saturation flux to a controlled flux reset point, the control winding 24 is disposed in inductive relationship with the core member 12 so that when the polarity of the control signal is as illustrated in Fig. 1 with the terminal 26 positive, the resultant current through the control winding 24 produces a flux in opposition to the flux produced by the current flow through the exciting winding 14 during its conducting periods. In practice the control signal can either be alternating-current or direct-current and the magnitude and polarity of this control signal determines the positioning of the controlled flux reset point and thus, the amount of flux change that will be produced by the current flow through the exciting winding 14 in changing the core member 12 to positive saturation.

In order to prevent the flow of induced current in the control circuit, including the control winding 24, which could be brought about by the pulsating current flowing through the exciting winding 14, a high impedance, in this instance a resistor 30, is connected in circuit relationship with the terminals 26 and 28 and with the control winding 24. This impedance 30 should be incorporated in the apparatus whether an alternating-current or a direct-current control signal is applied to the terminals 26 and 28.

For the purpose of obtaining an output to a load 32, the output winding 23 is also disposed in inductive relationship with the core member 12. The output winding 23 is responsive to the change in flux in the core member 12 that occurs during the alternate half-cycles of the alternating-current supply voltage, as applied to the terminals 16 and 18, when the exciting winding 14 is conducting current and when the flux level in the core member 12 changes from the controlled flux reset point to saturation flux. The output winding 23 may be loaded during the periods when the exciting winding 14 is conducting current, as applied to the terminals 16 and 18, but if a low control power input to the terminals 26 and 28 is desired, the output winding 23 should not be loaded during the non-conducting period of the exciting winding 14. In order to prevent the loading of the output winding 23 during the non-conducting period of the exciting winding 14, a rectifier 36 is connected in circuit relationship with the output winding 23 and the load 32.

From the above discussion, it can be seen that the output obtained at the load 32 during a conducting period of the exciting winding 14 is determined by the point to which the flux in the core member 12 has been reset by the control signal during the preceding non-conducting period of the exciting winding 14. However, the operation of the magnetic amplifier 10 illustrated in Fig. 1 can be better understood by referring to Fig. 2A. In Fig. 2A there is illustrated an idealistic hysteresis loop for the core member 12. First consider the operation of the magnetic amplifier 10 when no control signal is applied to the terminals 26 and 28. Upon application of the alternating-current supply voltage to the terminals 16 and 18, the flux in the core member 12 reaches positive saturation some time during the first conducting period of the exciting winding 14 and returns to the residual flux density point as represented at 40. During the next half-cycle of the alternating-current supply voltage applied to the terminals 16 and 18, no magnetomotive forces are being applied to the core member 12 and the flux in the core member 12 remains at the residual flux density point as represented at 40. Since the flux in the core member 12 remains constant at positive saturation, and since there is no flux change in the core member 12, the output from the magnetic amplifier 10 to the load 32 is of zero magnitude. However, if either an alternating-current control signal or a direct-current control signal of a predetermined magnitude and of a polarity as indicated is applied to the terminals 26 and 28, the flux level in the core member 12 is changed or driven down to a controlled flux reset point as represented at 42 during the next half-cycle of the supply voltage applied to the terminals 16 and 18 when the exciting winding 14 is non-conducting. Since there is a flux change in the core member 12 associated with this resetting operation, a voltage is induced in the output winding 23. If it is desired to keep the control source power requirements to a minimum, then it is necessary to keep the loading on the output winding 23 to a minimum during this resetting operation. As hereinbefore mentioned, this is accomplished by connecting the rectifier 36 in circuit relationship with the output winding 23 and the load 32. In operation, the rectifier 36 prevents current flow which would be caused by the induced voltage appearing across the output winding 23 during the resetting operation.

With the operating point reset to the controlled flux reset point, as represented at 42, during the non-conducting period of the exciting winding 14, the next half-cycle of alternating-current supply voltage causes the core operating point to move from the controlled flux reset point, as represented at 42, along the right hand side of the hysteresis loop to positive saturation to thereby induce a voltage across the output winding 23, which induced voltage effects a current flow through the load 32. As hereinbefore mentioned, the average voltage appearing across the load 32 is determined by the magnitude of the change in flux in the core member 12 in going from the controlled flux reset point, as represented at 42, to positive saturation of the core member 12.

Since the average output voltage across the load 32 is determined by the change in flux in the core member 12 in going from the controlled flux reset point 42 to flux saturation of the core member 12, and since the supply voltage applied to the terminals 16 and 18 is always of sufficient magnitude to effect such a flux saturation of the core member 12, the average output voltage of the magnetic amplifier 10 and thus, the average output voltage across the load 32 is independent of the magnitude of the supply voltage applied to the terminals 16 and 18. It is also to be noted that a substantially absolute zero output can be obtained from the magnetic amplifier 10 by application of either a direct-current or alternating-current control signal to the terminals 26 and 28 of sufficient magnitude and of opposite polarity to that indicated in Fig. 1 to keep the flux in the core member 12 at flux saturation at all times.

Referring to Fig. 2B, there is illustrated a curve 44 representing the manner in which the voltage across the output winding 23 and thus, the voltage across the load 32 varies with changes in the magnitude of the direct-current control signal applied to the terminals 26 and 28. For instance, a point 40*a* corresponds to the residual flux density point 40 illustrated in Fig. 2A. On the other hand, point 42*a* corresponds to the control flux reset point 42 illustrated in Fig. 2A. Thus, when the flux in the core member 12 is reset to the control flux reset point 42 illustrated in Fig. 2A, the output voltage across the load 32 is as represented at 42*a* in Fig. 2B.

Referring to Fig. 3, there is illustrated another embodiment of this invention in which like components of Figs. 1 and 3 have been given same reference characters. The main distinction between the apparatus illustrated in Figs. 1 and 3 is that in the apparatus illustrated in Fig. 3, the reactor or exciting winding 14 serves as both the exciting winding and the output winding for the magnetic amplifier. In particular, the series circuit including the rectifier 36 and the load 32 is connected across the reactor winding 14, the rectifier 36 being a necessary component when the load 32 is interconnected with the reactor winding 14.

In operation, again the magnitude of the control signal applied to the terminals 26 and 28 determines the position of the controlled flux reset point of the core member 12. Once the controlled flux reset point has been established during a non-conducting period of the exciting winding 14, current flows simultaneously, during the next half-cycle of the supply voltage, through the reactor winding 14 and the load 32, the greater part of the current flowing through the load 32. Current continues to flow simultaneously through the reactor winding 14 and the load 32 until the core member 12 reaches saturation flux, at which time substantially all the current flows through the reactor winding 14 which has a small resistance compared to the resistance of the load 32. Since current continues to flow through the load 32 until the core member 12 reaches saturation flux, the average voltage across the load 32 is again determined primarily by the positioning of the controlled flux reset point as controlled by the magnitude of the control signal applied to the terminals 26 and 28.

Referring to Fig. 4, there is illustrated a further embodiment of this invention in which like components of Figs. 3 and 4 have been given the same reference characters. In the apparatus illustrated in Fig. 4, the reactor winding 14 not only functions as the exciting and the output winding for the magnetic amplifier, but the reactor winding 14 also functions as the control winding. Thus, the main distinction between the apparatus illustrated in Figs. 3 and 4 is that in the apparatus illustrated in Fig. 4, the control signal is applied to the reactor winding 14 instead of to the control winding 24 as illustrated in Fig. 3. In particular, the terminal 28 is connected through the resistor 30 to one end of the reactor winding 14 and the other end of the reactor winding 14 is connected to the terminal 26.

The operation of the apparatus of Fig. 4 is similar to the operation of the apparatus illustrated in Fig. 3, except that in the apparatus of Fig. 4 the current flow through the reactor winding 14, as produced by the control voltage across the terminals 26 and 28, effects a change in the flux level in the core member 12 to the controlled flux reset point. Otherwise, the operation of the apparatus illustrated in Fig. 4 is similar to the operation of the apparatus illustrated in Fig. 3, and, therefore, a further description of such operation is deemed unnecessary.

Referring to Fig. 5, there is illustrated a full-wave saturating transformer magnetic amplifier 50 embodying another teaching of this invention. As illustrated, the magnetic amplifier 50 comprises two magnetic core members 52 and 54 which are constructed preferably from rectangular loop core material. In this instance, the core member 52, has disposed in inductive relationship therewith, an exciting winding 56, a control winding 58, and an output winding 60. On the other hand, the core member 54 has disposed in inductive relationship therewith, an exciting winding 62, a control winding 64, and an output winding 66.

As illustrated, circuit means is provided for interconnecting the exciting windings 56 and 62 in circuit relationship with terminals 68 and 70, which are disposed to be connected to a source (not shown) of alternating-current supply voltage, so that when the terminal 70 is at a positive potential with respect to the terminal 68, current flows through the exciting winding 56 and so that when the terminal 68 is at a positive potential with respect to the terminal 70, current flows through an exciting winding 62. In particular, an impedance, in this instance a resistor 72, and a rectifier 74 are connected in series circuit relationship with the exciting winding 56, the series circuit being connected across the terminals 68 and 70, the rectifier 74 functioning to prevent the flow of current through the exciting winding 56 when the terminal 68 is at a positive potential with respect to the terminal 70.

The resistor 72 and a rectifier 76 are connected in series circuit relationship with the exciting winding 62, this series circuit also being connected across the terminals 68 and 70, the rectifier 76 functioning to prevent the flow of current through the exciting winding 62 when the terminal 70 is at a positive potential with respect to the terminal 68. As connected the resistor 72 functions to limit the flow of current through the exciting windings 56 and 62 when the core members 52 and 54, respectively, reach saturation flux. However, it is to be understood that a capacitor (not shown) or an inductance member (not shown) could be substituted for the resistor 72 to perform the same function as the resistor 72 with less power dissipation. It is also to be understood that the magnitude of the alternating-current supply applied to the terminals 68 and 70 should always be of sufficient magnitude to alternately effect a substantially complete magnetic saturation of the core members 52 and 54. The impedance 72 should also be such as to permit sufficient current flow through the exciting windings 56 and 62 to saturate the core members 52 and 54, respectively, under all conditions of loading on the other windings of the core members.

In order to alternately reset, during the non-conducting periods of the exciting windings 56 and 62, the flux level in the core members 52 and 54, respectively, from saturation flux to a given controlled flux reset point, circuit means are provided for rendering the control windings 58 and 64 responsive to a direct-current control signal which is applied to terminals 80 and 82 as indicated in Fig. 5. In particular, the control windings 58 and 64 are connected in series circuit relationship with one another, one end of the series circuit being connected to the terminal 80 and the other end of the series circuit being connected to the terminal 82. As illustrated, the control windings 58 and 64 are so interconnected with the terminals 80 and 82 and are so disposed on their respective core members 52 and 54 that current flow therethrough, as effected by a control signal of a polarity as shown, produces a flux in the core members 52 and 54, respectively, in opposition to the flux produced in the core members 52 and 54, respectively, by the current flow through the exciting windings 56 and 62, respectively.

As illustrated, circuit means is provided for interconnecting a load 84 with the output windings 60 and 66 so that direct current flows through the load, the magnitude of this direct current flow through the load 84 depending on the change in flux in each of the core members 52 and 54 that occurs during the conducting periods of the exciting windings 56 and 62, respectively, when the flux level in the core members 52 and 54, respectively, changes from a given controlled flux reset point to saturation flux. As illustrated, a load rectifier 86 is connected in series circuit relationship with the output winding 60 and with the load 84 and a load rectifier 88 is connected in series circuit relationship with the output winding 66 and with the load 84 to thereby provide a direct current output for the load 84.

The operation of the apparatus illustrated in Fig. 5 will now be described. When the terminal 70 is at a positive potential with respect to the terminal 68, current flows from the terminal 70 through the rectifier 74, the exciting winding 56, and the resistor 72 to the terminal 68. Such a current flow through the exciting winding 56 effects an increase in the flux level in the core member 52 from the controlled flux reset point to saturation flux. As hereinbefore discussed, the magnitude of the current flow through the control winding 58 determines the position of the controlled flux reset point, and thereby the magnitude of the voltage induced across the output winding 60 and thus the magnitude of the average current that flows through the rectifier 86 and the load 84 due to the change in the flux level in the core member 52 from the controlled flux reset point to saturation flux.

During the next half-cycle of the alternating-current supply voltage as applied to the terminals 68 and 70, current flows from the terminal 68 through the resistor 72, the exciting winding 62, and the rectifier 76 to the terminal 70 to thereby drive the core member 54 to saturation flux. Again, the magnitude of this change in flux produced by the current flow through the exciting winding 62 is determined by the magnitude of the current flow through the control winding 64, which in turn determines the controlled flux reset point for the core member 54. With a change in the magnitude of the flux in the core member 54 as produced by the current flow through the exciting winding 62, voltage is induced across the output winding 66 to thereby effect a current flow through the rectifier 88 and the load 84, the magnitude of this current flow being determined by the magnitude of the change of flux in the core member 54 in going from the controlled flux reset point to saturation flux.

Referring to Fig. 6 there is illustrated another full-wave saturating transformer magnetic amplifier embodying a further teaching of this invention. The magnetic amplifier 94, illustrated in Fig. 6 is similar to the magnetic amplifier 50 illustrated in Fig. 5 and the same reference characters have been given to like components to Figs. 5 and 6. The main distinction between the magnetic amplifiers 50 and 94 is that the magnetic amplifier 94 is adapted to receive an alternating-current control signal which is applied to the terminals 80 and 82. In order to enable the amplifier 94 to properly respond to an alternating-current control signal, the control winding 96 is properly disposed on the core member 54. As can be seen from the drawings, the control winding 96 is wound oppositely from the corresponding control winding 64 illustrated in Fig. 5. By so disposing the control winding 96 on the core member 54, the alternating-current control signal as applied to the terminals 80 and 82 is able to effect a proper resetting of the flux level in the core member 54 when the core member 52 is being driven to saturation flux by the current flow through the exciting winding 56. Also, a proper resetting of the flux level in the core member 52 is obtained when the core member 54 is being driven to saturation flux by the current flow through the exciting winding 62. The proper phase relationship between the alternating-current control signal applied to the terminals 80 and 82 and the alternating-current supply voltage applied to the terminals 68 and 70 is indicated by the polarity signs associated with the terminals 70 and 82. In particular, the terminal 70 should be at a positive potential with respect to the terminal 68 when the terminal 82 is at a positive potential with respect to the terminal 80. However, the pulsating current flowing through the exciting windings 56 and 62 induces a voltage across the control windings 58 and 96, respectively, to thereby tend to establish an induced current flow in the control circuit connected to the terminals 80 and 82. Therefore, to limit such an induced current flow in the control circuit an impedance, in particular a resistor 98, is connected between one end of the control winding 96 and the terminal 82. Such a current limiting resistor 98 need not be provided in the corresponding control circuit illustrated in Fig. 5 since the control windings 58 and 64 are so disposed with respect to the exciting windings 56 and 62, respectively, that any voltages tending to be induced across the control windings 58 and 64 by the pulsating current flux through the exciting windings 56 and 62, respectively, tend to cancel each other out. Since the remaining operation of the apparatus illustrated in Fig. 6 is similar to the operation of the apparatus illustrated in Fig. 5, a further description of such operation is deemed unnecessary.

Referring to Fig. 7 there is illustrated another full-wave saturating transformer magnetic amplifier 99 embodying a further teaching of this invention and in which like components of Figs. 5 and 7 have been given the same reference characters. The main distinction between the apparatus illustrated in Figs. 5 and 7 is that in the apparatus illustrated in Fig. 7 circuit means is interconnected with the load windings 60 and 100 in order to obtain an alternating current output voltage across a load 102. It is to be noted that the output winding 100 of the magnetic amplifier 99 is wound oppositely from the corresponding output winding 66 as illustrated in Fig. 5. The remaining windings illustrated in Figs. 5 and 7 are wound in the same direction.

In operation when the terminal 70 is at a positive potential with respect to the terminal 68 so as to effect a change in the flux level in the core member 52 from a controlled flux reset point to saturation flux and thereby induce a voltage across the output winding 60, current flows through the rectifier 86 and the load 102. On the other hand when the terminal 68 is at a positive potential with respect to the terminal 70 so as to effect a change in the flux level in the core member 54 from a controlled flux reset point to saturation flux and thereby induce a voltage across the output winding 100, current flows through a rectifier 104 and the load 102. Therefore, alternating current flows through the load 102. Since the remainder of the operation of the apparatus illustrated in Fig. 7 is substantially the same as the operation of the apparatus illustrated in Fig. 5, a further description of such operation is deemed unnecessary.

Referring to Fig. 8 there is illustrated another embodiment of the teachings of this invention and in which like components of Figs. 6, 7 and 8 have been given the same reference characters. The main distinction between the apparatus illustrated in Figs. 6 and 8 is that the apparatus illustrated in Fig. 8 is provided with an output circuit as illustrated in Fig. 7 in order to obtain alternating-current voltage across the load 102. The operation of the output circuit of the apparatus illustrated in Fig. 8 is substantially the same as the operation of the output circuit of the apparatus illustrated in Fig. 7. Also, the operation of the control circuit of the apparatus illustrated in Fig. 8 is substantially the same as the operation of the control circuit illustrated in Fig. 6.

The apparatus embodying the teachings of this invention has several advantages. For instance, all the embodiments previously described are substantially insensitive to changes in the magnitude of the alternating-current supply voltage as applied to the terminals 16 and 18 or to the terminals 68 and 70 over a fairly wide range of variation in the magnitude of the supply voltage. In addition, a substantially absolute zero output can be obtained from each of the embodiments previously described. Further, in the embodiments illustrated in Figs. 1, 5, 6, 7 and 8, the output winding is conductively isolated from the exciting winding. This is an important advantage in, for instance, push-pull operation where the output of two magnetic amplifiers are mixed. Since the output winding is isolated from the exciting winding, it is not necessary to provide an isolation transformer in such a push-pull magnetic amplifier embodying a teaching of this invention.

Since numerous changes may be made in the above described apparatus and circuits, and different embodiments of this invention may be made without departing from the spirit and scope thereof, it is intended that all the matter contained in the foregoing description or shown in the accompanying drawings shall be interpreted as illustrative and not in a limiting sense.

I claim as my invention:

1. In a saturating-transformer magnetic amplifier for supplying energy to a load, the combination comprising, magnetic core means, a winding disposed in inductive relationship with the magnetic core means, circuit means connected to the winding and to a source of alternating-current supply voltage for supplying current to the winding during alternate half-cycles of said alternating-current supply voltage, the winding, said circuit means, and the magnitude of said alternating-current supply voltage being such as to always effect a substantially complete magnetic saturation of the magnetic core means during said alternate half-cycles of said alternating-current supply voltage, means responsive to a control signal for resetting, during the other alternate half-cycles of said alternating-current supply voltage, the flux level in the magnetic core means from saturation flux to a controlled flux reset point, and output means for producing, over a wide range of variation in the magnitude of said alternating-current supply voltage, a voltage across the load proportional to only the change in flux in the magnetic core means that occurs during said alternate half-cycles of said alternating-current supply voltage when the flux level in the magnetic core means changes from the controlled flux reset point to saturation flux.

2. In a magnetic amplifier, the combination comprising, magnetic core means, an exciting winding disposed in inductive relationship with the magnetic core means, circuit means connected to the exciting winding and to a source of alternating-current supply voltage for supplying current to the exciting winding only during alternate half-cycles of said alternating-current supply voltage, the exciting winding and the magnitude of said alternating-current supply voltage being such as to always effect a substantially complete magnetic saturation of the magnetic core means during said alternate half-cycles of said alternating-current supply voltage, a control winding disposed in inductive relationship with the magnetic core means, the control winding being responsive to a control signal for resetting, during the other alternate half-cycles of said alternating-current supply voltage, the flux level in the magnetic core means from saturation flux to a controlled flux reset point, and an output winding disposed in inductive relationship with the magnetic core means and responsive to the change in flux in the magnetic core means that occurs during said alternate half-cycles of said alternating-current supply voltage when the flux level in the magnetic core means changes from the controlled flux reset point to saturation flux.

3. In a magnetic amplifier for supplying energy to a load, the combination comprising, a magnetic core member, an exciting winding disposed in inductive relationship with the magnetic core member, circuit means connected to the exciting winding and to a source of alternating-current supply voltage for supplying current to the exciting winding only during alternate half-cycles of said alternating-current supply voltage, the exciting winding and the magnitude of said alternating-current supply voltage being such as to always effect a substantially complete magnetic saturation of the magnetic core member during said alternate half-cycles of said alternating-current supply, voltage, a control winding disposed in inductive relationship with the magnetic core member, the control winding being responsive to a control signal for resetting, during the other alternate half-cycles of said alternating-current supply voltage, the flux level in the magnetic core member from saturation flux to a controlled flux reset point, an output winding disposed in inductive relationship with the magnetic core member and responsive to the change in flux in the magnetic core member that occurs during said alternate half-cycles of said alternating-current supply voltage when the flux level in the magnetic core member changes from the controlled flux reset point to saturation flux, and other circuit means including a rectifier for connecting the output winding to the load so that current flows through the load only during the conducting period of the exciting winding.

4. In a magnetic amplifier disposed to receive energy from a source of alternating-current supply voltage and to supply energy to a load, the combination comprising, a magnetic core member, an exciting winding disposed in inductive relationship with the magnetic core member, circuit means including a rectifier for interconnecting the exciting winding with the source of alternating-current supply voltge so that current is supplied to the exciting winding only during alternate half-cycles of said alternating-current supply voltage, the exciting winding and the magnitude of said alternating-current supply voltage being such as to always effect a substantially complete magnetic saturation of the magnetic core member during said alternate half-cycles of said alternating-current supply voltage, terminals for applying thereto a control signal, a control winding disposed in inductive relationship with the magnetic core member, other circuit means including a current limiting impedance for connecting the control winding to said terminals so that the control winding is responsive to the control signal to thereby reset, during the other alternate half-cycles of said alternating-current supply voltage, the flux level in the magnetic core member from saturation flux to a controlled flux reset point, an output winding disposed in inductive relationship with the magnetic core member and responsive to the change in flux in the magnetic core member that occurs during said alternate half-cycles of said alternating-current supply voltage when the flux level in the magnetic core member changes from the controlled flux reset point to saturation flux, and further circuit means including another rectifier for connecting the output winding to the load so that current only flows through the load during the conducting period of the exciting winding.

5. In a magnetic amplifier for supplying energy to a load, the combination comprising, a magnetic core member, a reactor winding disposed in inductive relationship with the magnetic core member, a rectifier connected in series circuit relationship with the load, the series circuit being connected in parallel circuit relationship with the reactor winding, circuit means including another rectifier, said circuit means being connected to the reaction winding and to a source of alternating-current supply voltage so that current flows through the parallel circuit including the reactor winding and the load only during alternate half-cycles of said alternating-current supply voltage and so that current is prevented from flowing through the reactor winding and the load during the other alternate half-cycles of said alternating-current supply voltage, the reactor winding and the magnitude of said alternating-current supply voltage being such as to always effect a substantially complete magnetic saturation of the magnetic core member during said alternate half-cycles of said alternating-current supply voltage, and a control winding disposed in inductive relationship with the magnetic core member, the control winding being responsive to a control signal for resetting, during said other alternate half-cycles of said alternating-current supply voltage, the flux level in the magnetic core member from saturation flux to a controlled flux reset point.

6. In a magnetic amplifier for supplying energy to a load, the combination comprising, a magnetic core member, a reactor winding disposed in inductive relationship with the magnetic core member, a rectifier connected in series circuit relationship with the load, the series circuit being connected in parallel circuit relationship with the reactor winding, circuit means including another rectifier, said circuit means being connected to the reactor winding and to a source of alternating-current supply voltage so that current flows through the parallel circuit including the reactor winding and the load during alternate half-cycles of said alternating-current supply voltage and so that current is prevented from flowing through the reactor winding and the load during the other alternate half-cycles of said alternating-current supply voltage, the reactor winding and the magnitude of said alternating-current supply voltage being such as to always effect a substantially complete magnetic saturation of the magnetic core member during said alternate half-cycles of said alternating-current supply voltage, and other circuit means connected to the reactor winding and responsive to a control signal for resetting, during said other alterntae half-cycles of said alternating-current supply voltage, the flux level in the magnetic core member from saturation flux to a controlled flux reset point.

7. In a full-wave magnetic amplifier for supplying energy to a load, the combination comprising, two magnetic core members, each of said magnetic core members having disposed in inductive relationship therewith an exciting winding, a control winding, and an output winding, circuit means for interconnecting said exciting windings with a source of alternating-current supply voltage so that during one half-cycle of said alternating-current supply voltage current is supplied to one of said exciting windings and so that during the next half-cycle of said alternating-current supply voltage current is supplied to the other of said exciting windings, the magnitude of said alternating-current supply voltages being such as to always effect a substantially complete magnetic saturation of said core members when current flows through their associated exciting windings, other circuit means for rendering said control windings responsive to a control signal for alternately resetting, during the non-conducting periods of said exciting windings, the flux level in the respective magnetic core members from saturation flux to a controlled flux reset point, and further circuit means for interconnecting the load with said output windings so that current flows through the load, the magnitude of such current flow through the load depending upon the change in flux in each of the magnetic core members that occurs during the conductive periods of their associated exciting windings when the flux level in the respective magnetic core members changes from the controlled flux reset point to saturation flux.

8. In a full-wave magnetic amplifier for supplying energy to a load, the combination comprising, two magnetic core members, each of said core members having disposed in inductive relationship therewith an exciting winding, a control winding, and an output winding terminals for applying thereto an alternating-current supply voltage, a series circuit including a rectifier, one of said exciting windings, and an impedance member, the series circuit being connected across said terminals, another series circuit including the other of said exciting windings, said impedance member, and another rectifier, said another series circuit also being connected across said terminals so that current is alternately supplied to said exciting windings, said alternating-current supply voltage always being of sufficient magnitude to effect a substantially complete magnetic saturation of said magnetic core members when current flows through their associated exciting windings, other circuit means for rendering said control windings responsive to a control signal for alternately resetting, during the non-conducting periods of said exciting windings, the flux level in the respective magnetic core members from saturation flux to a controlled flux reset point, and further circuit means for interconnecting the load with said output windings so that current flows through the load, the magnitude of such current flow through the load depending upon the change in flux in the respective magnetic core members that occurs during the conducting periods of their associated exciting windings when the flux level in the respective magnetic core members changes from the controlled flux reset point to saturation flux.

9. In a full-wave magnetic amplifier for supplying energy to a load, the combination comprising, two magnetic core members, each of said core members having disposed in inductive relationship therewith an exciting winding, a control winding, and an output winding, terminals for applying thereto an alternating-current supply voltage, a series circuit including a rectifier, one of said exciting windings, and an impedance member, the series circuit being connected across said terminals, another series circuit including the other of said exciting windings, said impedance member, and another rectifier, said another series circuit also being connected across said terminals so that current is alternately supplied to said exciting windings, said alternating-current supply voltage always being of sufficient magnitude to effect a substantially complete magnetic saturation of said magnetic core members when current flows through their associated exciting windings, other circuit means including a current limiting impedance for rendering said control windings responsive to an alternating-current control signal for alternately resetting, during the non-conducting periods of said exciting windings, the flux level in the respective magnetic core members from saturation flux to a controlled flux reset point, and further circuit means for interconnecting the load with said output windings so that current flows through the load, the magnitude of such current flow through the load depending upon the change in flux in the respective magnetic core members that occurs during the conducting periods of their associated exciting windings when the flux level in the respective magnetic core members changes from the controlled flux reset point to saturation flux.

References Cited in the file of this patent

UNITED STATES PATENTS

| | | |
|---|---|---|
| 2,229,952 | Whiteley et al. | Jan. 28, 1941 |
| 2,603,768 | Trindle | July 15, 1952 |

OTHER REFERENCES

"Magnetic Amplifier Definitions," Electrical Manufacturing, July 1952, vol. 50, in S. L., pp. 88–91, 252 and 254.

"Magnestats and Their Applications," Electrical Review, vol. 151, July 1952, in S. L., pp. 173–178 incl.